Sept. 19, 1933.   H. C. ROTH   1,927,597
SPEED INDICATOR
Filed May 2, 1930

Inventor
Harris Calloway Roth
By Jones, Addington, Ames & Seibold
Attys.

Witness
David S. Suagnusson

Patented Sept. 19, 1933

1,927,597

UNITED STATES PATENT OFFICE 1,927,597

SPEED INDICATOR

Harris Calloway Roth, South Bend, Ind., assignor to Adiel Y. Dodge, South Bend, Ind.

Application May 2, 1930. Serial No. 449,120

5 Claims. (Cl. 264—1)

My invention relates to speed indicators.

One of the objects of my invention is to provide a speed indicator by means of which the speed of moving parts which are difficult of determination by ordinary means may be obtained. For instance, to get the speed of rotation of shafting it is customary to use a tachometer, which is pressed against the end of the rotating shaft and which will indicate the speed at which the shaft is rotated. Sometimes, however, it is difficult to get access to the end of the shaft or the shafting itself may be inaccessible.

In order to determine the speed of such shafting, or the like, I propose to place indicia on the rotatable shaft, which will appear and disappear from view as the shaft rotates, and to provide an instrument which gives a perceptible signal periodically and has provisions for adjustment so that the period can be varied to bring it into synchronism with the rotatable shaft and which instrument also has provisions for indicating the frequency of the periodic signal made by it, so that by adjusting the instrument to bring it into synchronism with the shaft and noting the frequency or speed at which the instrument is operating the speed of the shaft itself may be determined.

In the drawing, in which an embodiment of my invention is shown:

Figure 1:
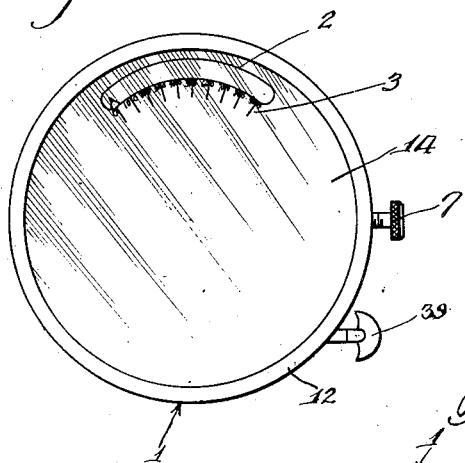
Figure 1 is a face view of a speed indicator embodying my invention.
Figure 2:
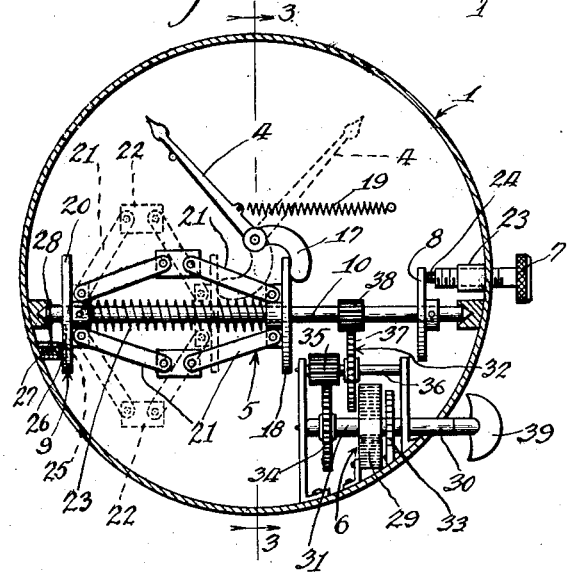
Fig. 2 is a sectional view substantially on the line 2—2 of Fig. 3.
Figure 3:
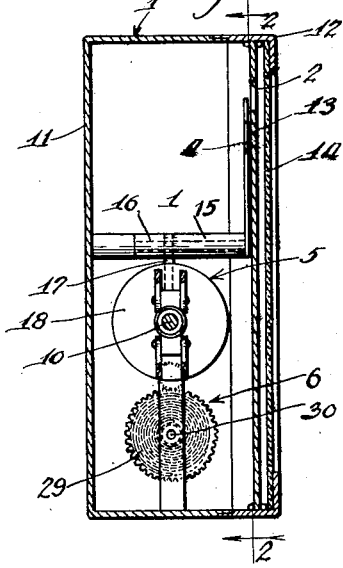
Fig. 3 is a sectional view substantially on the line 3—3 of Fig. 2.
Figure 4:
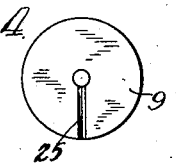
Fig. 4 is a face view of the frequency indicator disc.

Referring to the drawing in detail, the construction shown comprises a two-part circular or drum-like casing 1, having an arcuate slot 2 with a scale 3 adjacent thereto, a pivoted pointer or speed indicator 4 cooperating with said scale 3, a fly-ball governor construction 5 for controlling the position of said indicator 4, a spring motor mechanism 6 for driving the fly-ball governor 5, a friction-adjusting screw bearing 7 on a friction disc 8 for controlling the speed of the fly-ball governor 5 and an audible and tactual frequency indicator 9 for causing periodic signals to be made, one signal for each revolution of the governor shaft 10.

The drum-like casing 1 comprises the dished body portion 11, in which the mechanism is mounted and a dished cover portion 12 screwed onto the body portion 11 and carrying the plate 13, which is provided with the arcuate slot 2, and also carrying a transparent front plate 14.

The pointer 4 is mounted on a sleeve 15, which in turn is pivotally mounted on a pin 16 secured to the main body portion 11. This sleeve 15 has extending laterally therefrom a curved cam lever 17, the end of which engages the movable disc 18 of the fly-ball governor 5. A light tension spring 19 is provided, which holds the end of the curved arm 17 in contact with the movable disc 18.

The fly-ball governor construction 5 comprises the frequency indicator disc 20 secured to the rotatable shaft 10, the pointer controller disc 18 slidable on the rotating shaft 10 and the pivoted governor links 21 and weights 22 connecting the slidable disc 18 with the non-slidable disc 20, the construction being such that the faster the shaft 10 rotates the farther out the weights 22 will be thrown against the action of the compression spring 23 surrounding the shaft 10 and acting against the slidable disc 18.

The speed controlling means comprises a friction disc 8 secured to the rotatable shaft 10 and the adjusting screw 7 threaded in a sleeve 23 secured to the body portion 11 of the casing 1 and having a leather tip 24 bearing against the friction disc 8. The frequency indicator construction comprises the rotatable disc 20 in which a V-shaped groove 25 is provided with which cooperates a spring-pressed ball 26 so that for each revolution of the disc 20 the ball 26 will drop into the groove 25, causing a clicking sound, which serves as a frequency indication. The jar made by the ball dropping in would also be felt by one holding the instrument in his hand. A light compression spring 27 mounted in the sleeve 28 tends to press the ball 26 against the disc 20.

The spring motor construction comprises a spiral coil spring 29 having one end secured to the winding shaft 30 and the other end secured to the drive shaft 31 and gear transmissions 32 from the drive shaft 31 to the governor shaft 10. A suitable ratchet and pawl construction 33 may be provided for holding the winding shaft 30 against retrograde movement. The transmission from the drive shaft 31 to the governor shaft 10 comprises a gear 34 mounted on the drive shaft 31, a pinion 35 meshing with this gear 34, a shaft 36 on which this pinion 35 is mounted, a gear 37 mounted on this shaft 36 and a pinion 38 mounted on the governor shaft 10. A suitable thumbpiece or handle 39 is provided on the winding shaft 30 for winding up the spring 29.

In use, the operator holding the instrument in one hand will observe the indicia or mark on the rotatable shaft or other rotatable or movable member, the frequency of which is to be determined, and will adjust the speed-controlling screw 7 until the frequency of the audible and tactual signal occasioned by the clicking of the ball 26 is in synchronism with the frequency of the observed rotatable member, the frequency of which is to be determined, and when the state of synchronism has been attained the speed of the governor shaft may be read on the scale and this speed will correspond both to the frequency of the governor shaft 10 and to the speed or frequency of the observed rotatable member which is rotating in synchronism with the governor shaft 10.

While I have shown but one form of my invention, it is obvious that various other forms are covered and defined by the appended claims.

I claim:

1. A device for determining the frequency of periodic visual sensations comprising means for causing periodic tactual sensations, means controllable by the user of the device for varying the frequency of the caused tactual sensations whereby they may be brought into synchronism with the periodic visual sensations having frequency to be determined, and means for indicating numerically the frequency of the caused sensations.

2. A portable and detached device for determining the frequency of visual periodic sensations comprising means for causing periodic tactual sensations, means controllable by the user of the device for varying the frequency of the caused sensations whereby they may be brought into synchronism with the visual sensations of which the frequency is to be determined, and means for indicating the frequency of the caused sensations on a scale.

3. A portable and detached device for determining the frequency of visual periodic sensations comprising means for causing periodic auditory sensations, means controllable by the user of the device for varying the frequency of the caused sensations whereby they may be brought into synchronism with the visual sensations of which frequency is to be determined, and means for indicating the frequency of the caused auditory sensations.

4. A device for determining the frequency of periodic audible or visual sensations remote and disconnected therefrom comprising means for causing periodic tactual or auditory sensations, means controllable by the user of the device for varying the frequency of the caused sensations whereby they may be brought into synchronism with the sensations of which frequency is to be determined, and means for indicating visually the frequency of the caused sensations.

5. In an article of manufacture a small portable device to be used as a remote tachometer comprising means for determining the frequency of visual periodic sensations, means for causing periodic sensations, means controllable by the use of the device for varying the frequency of the cause of the sensations whereby they may be brought into synchronism with the sensations of which frequency is to be determined, means for indicating the frequency of the caused sensations comprising rotatable centrifugal force means, the speed of which corresponds to the said frequency, and means for controlling said indicating means, said means for varying the frequency comprising a rotatable member and a manually adjustable member for frictionally engaging said rotatable member.

HARRIS CALLOWAY ROTH.